United States Patent
Eroz et al.

(10) Patent No.: US 10,763,993 B2
(45) Date of Patent: Sep. 1, 2020

(54) SYSTEM AND METHOD FOR ASYNCHRONOUS MULTI-STREAM TRANSMISSION FOR NOMA

(71) Applicant: Hughes Network Systems, LLC, Germantown, MD (US)

(72) Inventors: Mustafa Eroz, Germantown, MD (US); Lin-Nan Lee, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 83 days.

(21) Appl. No.: 16/010,526

(22) Filed: Jun. 18, 2018

(65) Prior Publication Data

US 2019/0140770 A1    May 9, 2019

Related U.S. Application Data

(60) Provisional application No. 62/582,274, filed on Nov. 6, 2017.

(51) Int. Cl.
*H03M 13/00* (2006.01)
*H04L 1/00* (2006.01)
(Continued)

(52) U.S. Cl.
CPC ............ *H04L 1/0041* (2013.01); *H04J 15/00* (2013.01); *H04L 1/0042* (2013.01);
(Continued)

(58) Field of Classification Search
CPC .... H04J 15/00; H04J 2011/0006; H04J 14/06; H04J 11/004; H04J 13/004; H04J 13/18;
(Continued)

(56) References Cited

U.S. PATENT DOCUMENTS

| | | | | |
|---|---|---|---|---|
| 8,385,305 B1* | 2/2013 | Negus | ...................... | H04J 1/00 370/338 |
| 2003/0053435 A1* | 3/2003 | Sindhushayana | ..... | H04L 1/0007 370/342 |
| 2003/0091119 A1* | 5/2003 | Hofmann | .............. | H03M 13/35 375/260 |
| 2003/0123877 A1* | 7/2003 | Lo | ........................ | H04B 10/532 398/34 |

(Continued)

FOREIGN PATENT DOCUMENTS

WO    2017177899 A1    10/2017

OTHER PUBLICATIONS

N. Becker, et al: "Spread Asynchronous Scrambled Coded Multiple Access (SA-SCMA)—A New Efficient Random Access Method", 2016 IEEE Global Communications Conference (Globecom), Dec. 4, 2016 (Dec. 4, 2016), pp. 1-6, XP033059014, DOI: 10.1109/GLOCOM.2016.7842292 [retrieved on Feb. 2, 2017] abstract, figure 2.

(Continued)

*Primary Examiner* — Guerrier Merant
(74) *Attorney, Agent, or Firm* — NovoTechIP International PLLC

(57) ABSTRACT

Methods and apparatus for increasing spectral efficiency in non-orthogonal multiple access (NOMA) communication, that implement receiving a signal stream from a user, splitting the signal stream into a plurality of sub-streams, applying a forward error coding (FEC) to each one of the sub-streams, and outputting a corresponding plurality of FEC encoded sub-streams. This can include modulating a corresponding carrier with each of the FEC encoded sub-streams, and combining and transmitting the corresponding plurality of modulated carrier signals. The modulated carrier signals can each carry a respective one of the FEC encoded sub-streams.

20 Claims, 7 Drawing Sheets

(51) Int. Cl.
- *H04L 5/00* (2006.01)
- *H04J 99/00* (2009.01)
- *H04W 52/34* (2009.01)
- *H04J 11/00* (2006.01)
- *H04L 27/26* (2006.01)

(52) U.S. Cl.
CPC .......... *H04L 1/0048* (2013.01); *H04L 1/0057* (2013.01); *H04L 5/0016* (2013.01); *H04L 5/0037* (2013.01); *H04J 11/004* (2013.01); *H04L 27/26* (2013.01); *H04W 52/346* (2013.01)

(58) Field of Classification Search
CPC . H04J 13/00; H04W 52/346; H04W 72/0466; H04W 72/048; H04L 1/0041; H04L 2001/0096; H04L 1/0054; H04L 1/005; H04L 1/0612; H04L 1/0625; H04L 1/0631; H04L 1/065; H04L 1/0059; H04L 1/0057; H04L 5/0016; H04L 5/0037; H04L 27/26; H04B 1/70735; H04B 2201/7097; H04B 10/532; H04B 1/7103; H04B 1/7073

See application file for complete search history.

(56) References Cited

U.S. PATENT DOCUMENTS

| | | | |
|---|---|---|---|
| 2009/0052503 A1* | 2/2009 | Santoru | H04B 7/1858 375/148 |
| 2009/0161783 A1 | 6/2009 | Ozluturk | |
| 2010/0183309 A1* | 7/2010 | Etemad | H04B 10/505 398/79 |
| 2010/0203854 A1* | 8/2010 | Yu | H04L 25/03834 455/127.1 |
| 2014/0068385 A1 | 3/2014 | Zhang et al. | |
| 2014/0086217 A1* | 3/2014 | Park | H04B 7/0408 370/335 |
| 2015/0304130 A1* | 10/2015 | Logothetis | H04L 1/0003 455/115.2 |
| 2017/0150528 A1* | 5/2017 | Becker | H04L 69/22 |
| 2017/0257195 A1* | 9/2017 | Maaref | H04L 1/189 |
| 2019/0007092 A1* | 1/2019 | Bayesteh | H04B 1/69 |
| 2019/0097677 A1* | 3/2019 | Sen | H04B 1/7103 |

OTHER PUBLICATIONS

International Search Report and Written Opinion dated Mar. 4, 2019 by the International Searching Authority (European Patent Office) in PCT Application PCT/US2018/059361.

* cited by examiner

SYSTEM AND METHOD FOR ASYNCHRONOUS MULTI-STREAM TRANSMISSION FOR NOMA

CROSS REFERENCE TO RELATED APPLICATION

This application claims the benefit of priority from U.S. Provisional Patent Application Ser. No. 62/582,274 filed Nov. 6, 2017, and entitled "SYSTEM AND METHOD FOR ASYNCHRONOUS MULTI-STREAM TRANSMISSION FOR NOMA," which is incorporated by reference herein in its entirety.

BACKGROUND

Non-orthogonal multiple access (NOMA) is a wireless bandwidth sharing technique where multiple users can concurrently occupy channel bands, with each user optionally encoded by error detection/correction coding, e.g., forward error correction (FEC), and can be sorted at a receiver, by the receiver applying for example successive interference cancellation (SIC) or other known techniques. This contrasts to multiplexing techniques such as time-division multiple access (TDMA), frequency-division multiple access (FDMA), and orthogonal frequency-division multiple access (OFDM), which generally allocate per-user frequency bands, or time slots, or both.

However, for certain NOMA schemes, the FEC code rate needs to be low to provide acceptable performance in many applications. This can limit per user spectral efficiency. A technical need therefore exists for increasing per user spectral efficiency in those systems.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, certain details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, to avoid unnecessarily obscuring aspects of the present teachings.

Figure 1:
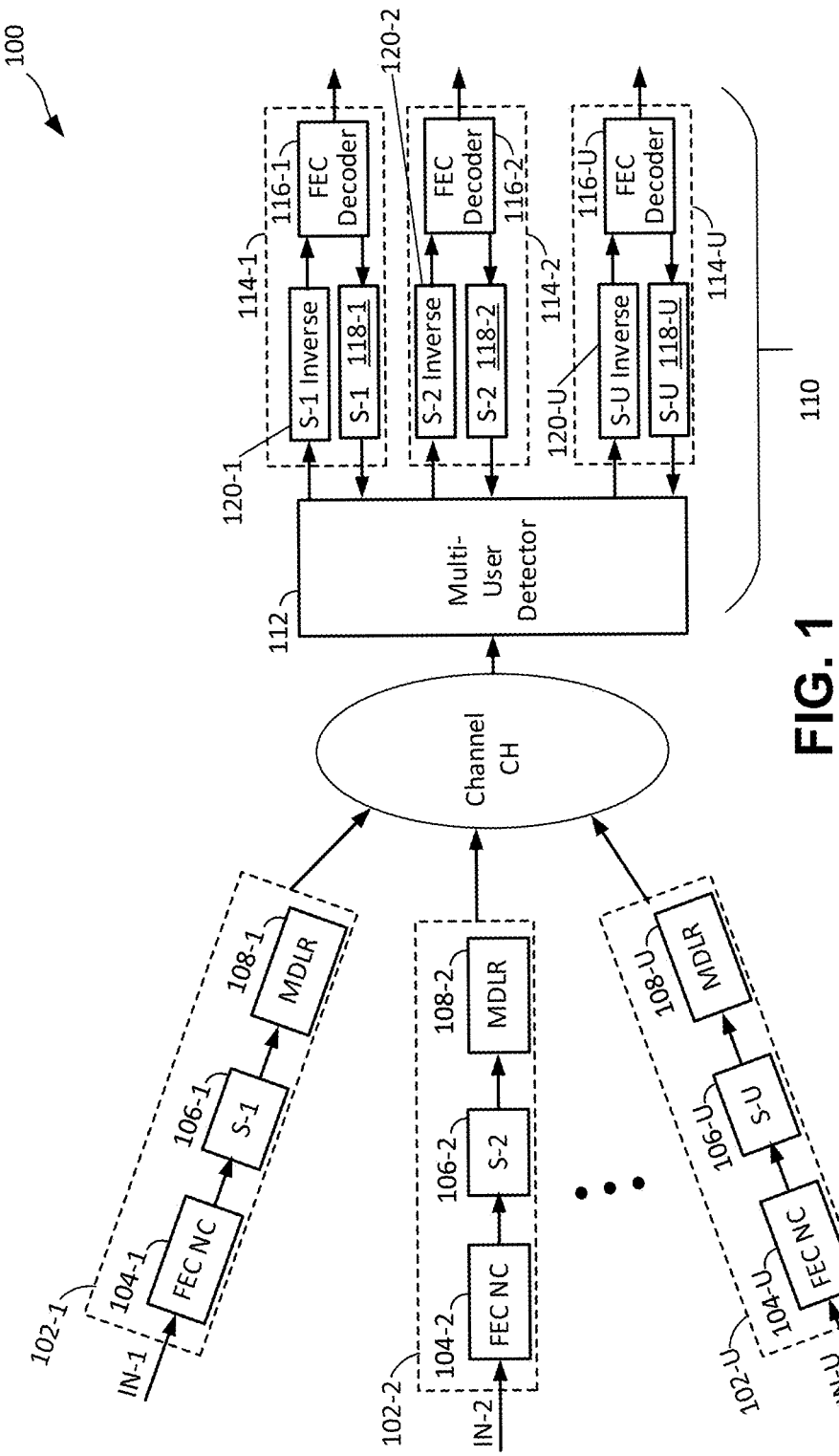
FIG. 1 illustrates one example non-orthogonal multiple access (NOMA) communication system, scrambled coded multiple access (SCMA).

FIG. 1 illustrates one example asynchronous scrambled coded multiple access (ASCMA) type NOMA communication system 100. The system 100 includes U transmitter apparatuses 102-$u$, for u=1 to U, (collectively "transmitter apparatuses 102") separated in three-dimensional space, for example, at U different terrestrial positions, or geo-orbital positions, or both. Each terminal 102-$u$ can be installed, for example, in a Very Small Aperture Terminal (VSAT) of a satellite-based communication system (not visible in FIG. 1), or in terrestrial user terminals. Each terminal 102-$u$ can include an FEC encoder 104-$u$ (collectively "FEC encoders 104"), illustrated in FIG. 1 as FEC encoders 104-1, 104-2 ... 104-U. The FEC configuration can be, for example, a turbo encoder, or a low density parity check coder (LDPC). The FEC encoders 104 can encode a received signal IN-u, by encoding a succession of K-bit blocks of IN-u into a corresponding output of C-bit blocks, $c_u$, each C-bit block including K information bits and C-K redundancy bits. The ratio of K to C is termed the "code rate."

Each terminal or transmitter apparatus 102-$u$, for u=1 to U, also includes a scrambler 106-$u$ (collectively "scramblers 106"), illustrated in FIG. 1 as scramblers 106-1, 106-2 ... 106-U. The scramblers 106 can each apply the same scrambling process, individually configured to provide each terminal 102 a user-specific scrambling pattern. In the FIG. 1 example, scrambler 106-1 can be configured to apply scrambling pattern S-1, scrambler 106-2 can be configured to apply scrambling pattern S-2, and so on, with scrambler 106-U being configured to apply scrambling pattern S-U.

Each terminal or transmitter apparatus 102's scrambler 106 can feed a corresponding modulator 108-$u$, u=1 to U (collectively "modulators 108"), illustrated in FIG. 1 as modulators 108-1, 108-2 ... 108-U. The modulators 108 can apply, for example, Quadrature Phase Shift Key (QPSK) modulation. The system 100 can also include an asynchronous SCMA (ASCMA) receiver portion 110.

The receiver portion 110 can be configured to provide an iterative soft-in soft-out multiuser detection and LDPC decoding. "Soft-in" refers to instances of bit signals received at the receiver portion 110 being assigned values other than 0 or 1, to indicate their estimated probability of being correctly detected, i.e., their reliability. "Soft-out" refers to instances of bits in the decoded output being similarly assigned values, other than "0" or "1," to indicate their respective reliability.

The receiver portion 110 can include a joint detector/interference canceller unit 112 and U receiving apparatuses 114, visible examples being 114-1, 114-2, ... 114-U. Each receiving apparatus 114 can include an FEC (e.g., LDPC) decoder, such as the examples 116-1, 116-2, ... 116-U (generically "FEC decoder(s) 116"). In an implementation, the FEC decoders 116 and the joint detector/interference canceller unit 112 can be configured to interact to iteratively produce an estimate of the received codewords. The configuration can include, in the receiving apparatuses 114, a descrambler, 120-1, 120-2, . . . 120-U (generically "descrambler(s) 120"), and a scrambler 118-1, 118-2, . . . 118-U (generically "scrambler(s) 118"). The receiver portion 110 can include a buffer (not visible in FIG. 1), configured to store a block of a signal composed of a summation of received signals from all U of the terminals 102. The summation can be termed a "composite waveform" or a "composite signal."

In an implementation of the receiver portion 110, upon a block of the composite waveform being sampled and stored in the buffer, a first pass can start by using the first descrambler, 120-1, and the first FEC (e.g., LDPC) decoder 116-1 to estimate a first bit-stream, i.e., a recovered IN-1. The joint detector/interference canceller unit 112 can then modify the stored block of the composite waveform using the estimated first bit stream. The receiver portion 110 can then use the second descrambler, 120-2, and the second FEC (e.g., LDPC) decoder 116-2 to estimate a second bit-stream, i.e., a recovered IN-2. When all the U bit-streams have been estimated, the receiver portion 110 can perform a second pass, starting with a second-pass estimation of the first bit-stream, again using the first descrambler 120-1 and the first FEC decoder 116-1 for a second pass estimation of the first bit-stream. The process can repeat for a required number of passes, and when completed can generate estimates of all U bit streams.

The above-described process provides for an arbitrary number of active users, e.g., an often-changing quantity U of active terminals or transmission apparatuses 102, can use the channel CH simultaneously. Benefits and features include user ability to transmit asynchronously without any coordination among themselves, in other words partial overlap between users is permitted.

On the other hand, in order for the iterative soft-in soft-out decoder to work successfully, the FEC code rate needs to be sufficiently low. This can limit per user spectral efficiency. Therefore, in certain applications, there may be a need to increase per user spectral efficiency.

Figure 2:
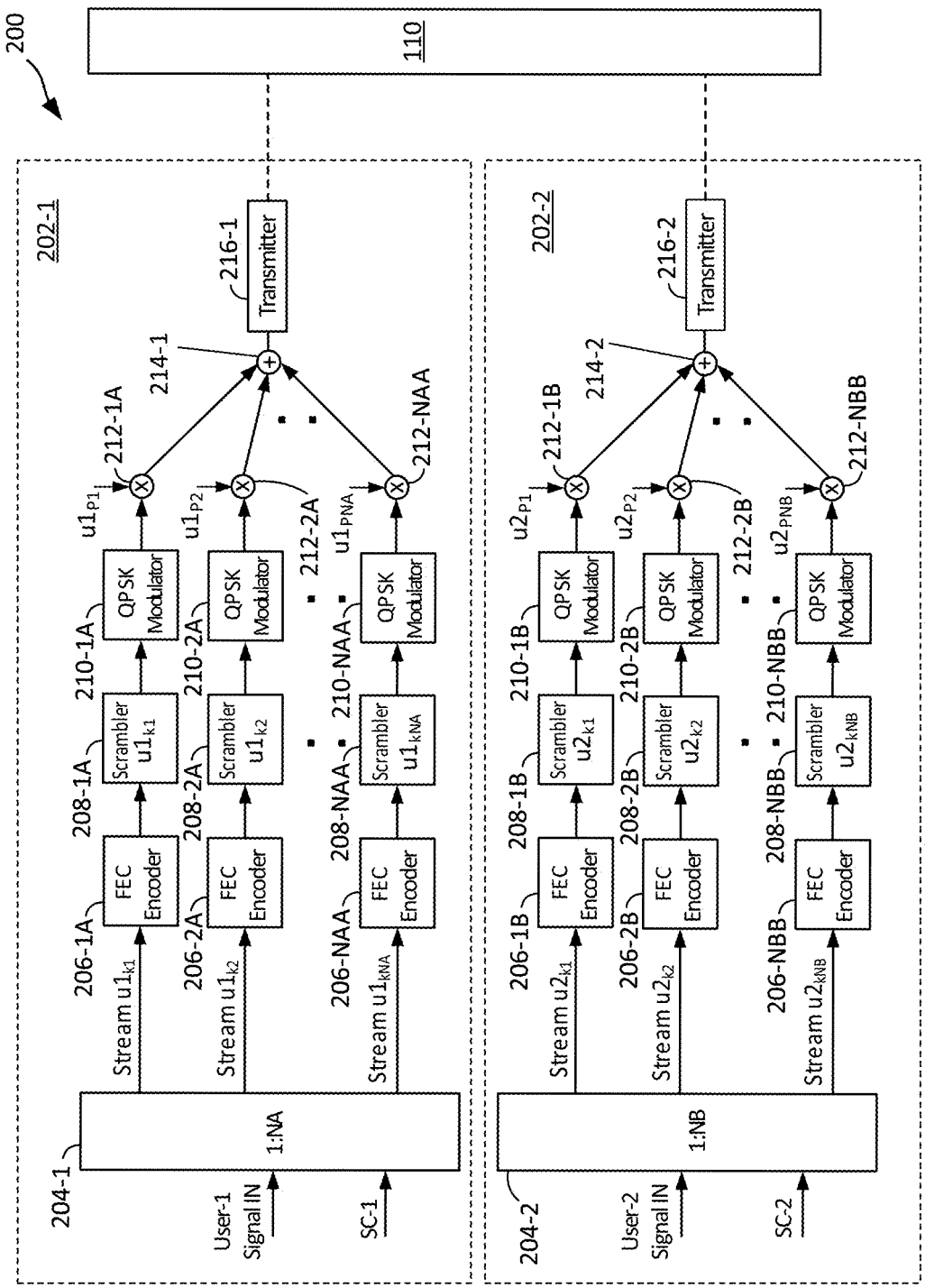
FIG. 2 illustrates one implementation of one exemplary system for multiple sub-stream transmit, NOMA communication, according to one or more aspects.

FIG. 2 illustrates one implementation of one exemplary system 200, for multiple sub-stream transmission NOMA communication, according to one or more aspects. In overview, as will be understood by persons of ordinary skill upon reading this disclosure in its entirety, and practicing according to its disclosed concepts and aspects, features of the system 200 and the methods the system supports include, but are not limited to, increasing per-user spectral efficiency by allocating a plurality of asynchronous coded multiple access (ACMA) streams to each user. Other technical features of, and provided by the system 200 and its supported methods include, but are not limited to, transparency from the perpective of the reciever portion 110. This transparency is such that implementation does not require any substantive change to the receiver portion 110. For example, assuming "N" to be an integer greater than zero, from the perspective of the receiver portion 100, a FIG. 2 system 200 N sub-stream replacement for a FIG. 1 terminal 102 appears as N separate, independent users. The receiver portion 110 can then decode each of the N sub-streams by applying conventional ACMA decoding techniques, for example, by applying the iterative process described above. There is no additional decoding complexity required at the receiver portion 110. Processing operations downstream of the receiver portion 110 can combine the multiple "indendent user" signals into a single signal.

Referring to FIG. 2, the system 200 includes a first multiple sub-stream ACMA transmission unit 202-1, associated with a first user U1, and a second multiple sub-stream ACMA transmission unit 202-2, associated with a second user U2. For brevity, the first multiple sub-stream ACMA transmission unit 202-1 and the second multiple sub-stream ACMA transmission unit 202-2 are collectively referenced as "multiple sub-stream ACMA transmission units 202."

Associated with each multiple sub-stream ACMA transmission unit 202, a 1:N splitter can receive the user signal and split the signal into N sub-streams, and it will be understood that "N" can differ among the units 202. In the FIG. 2 example, "N" for the first multiple sub-stream ACMA transmission unit 202-1 and "N" for the second multiple sub-stream ACMA transmission unit 202-2 will be referred to as "NA" and "NB," respectively. The first multiple sub-stream ACMA transmission unit 202-1 can include a 1:NA splitter 204-1, which can receive a User-1 Signal IN and split that signal into NA sub-streams, labeled u1$k$1, u1$k$2, . . . u1$k$NA. Similarly, the second multiple sub-stream ACMA transmission unit 202-2 can include a 1:NB splitter 204-2, which can receive a User-2 Signal IN and split that signal into NB sub-streams, labeled u2$k$1, u2$k$2, . . . u2$k$NB. Therefore, first multiple sub-stream ACMA transmission unit 202-1 has NA active substreams, and the second multiple sub-stream ACMA transmission unit 202-2 has NB active substreams, and so on for other multiple sub-stream ACMA transmission units 202. As described above, it will be understood that NA, NB, etc., are integers greater than zero. They can be distinct, or some or all of them can be the same.

Figure 3:
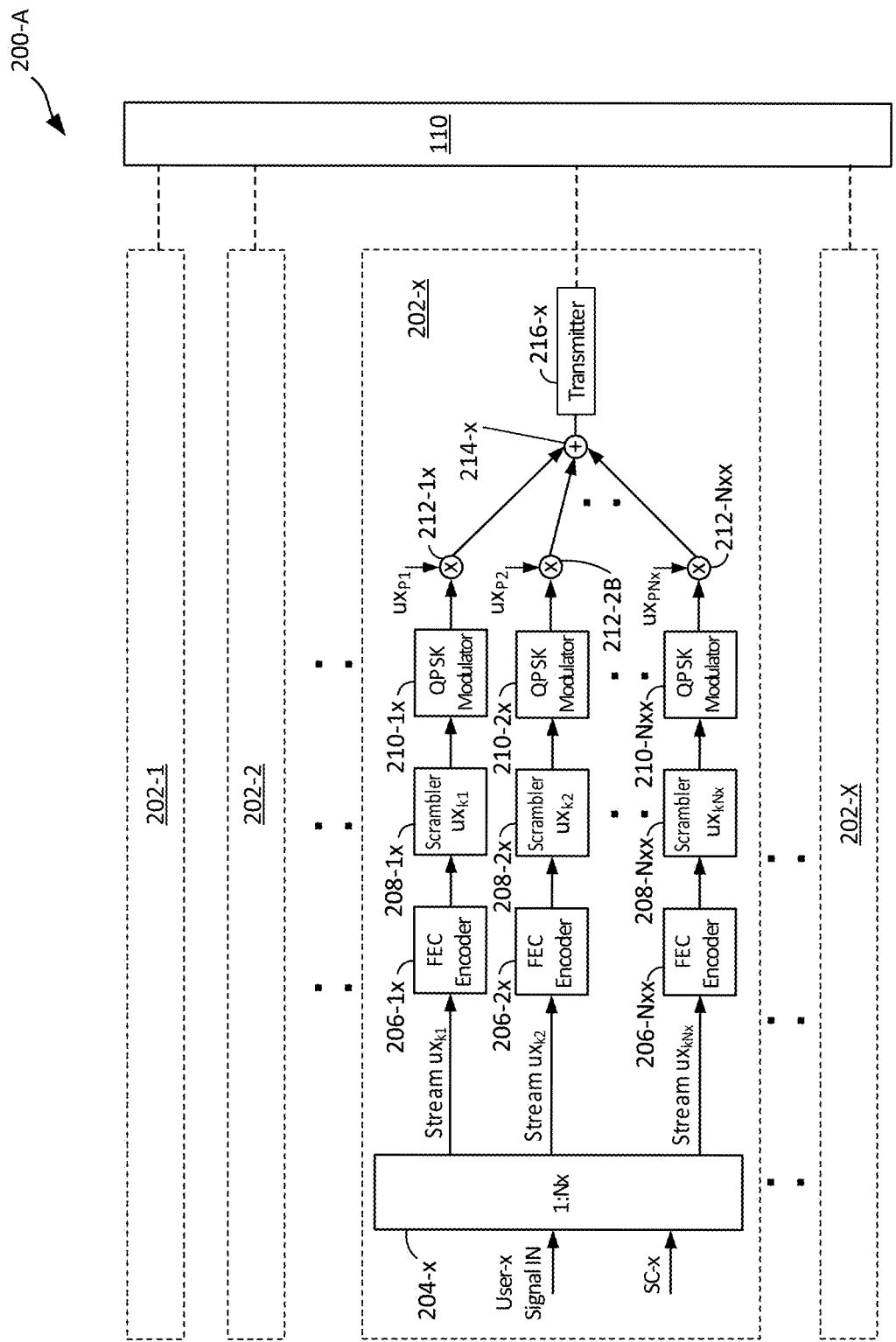
FIG. 3 illustrates another implementation of the FIG. 2 example, including additional multiple sub-stream, asynchronous coded multiple access (ACMA) terminals, in a system for multiple sub-stream transmit, NOMA communication, according to one or more aspects.
Figure 4:
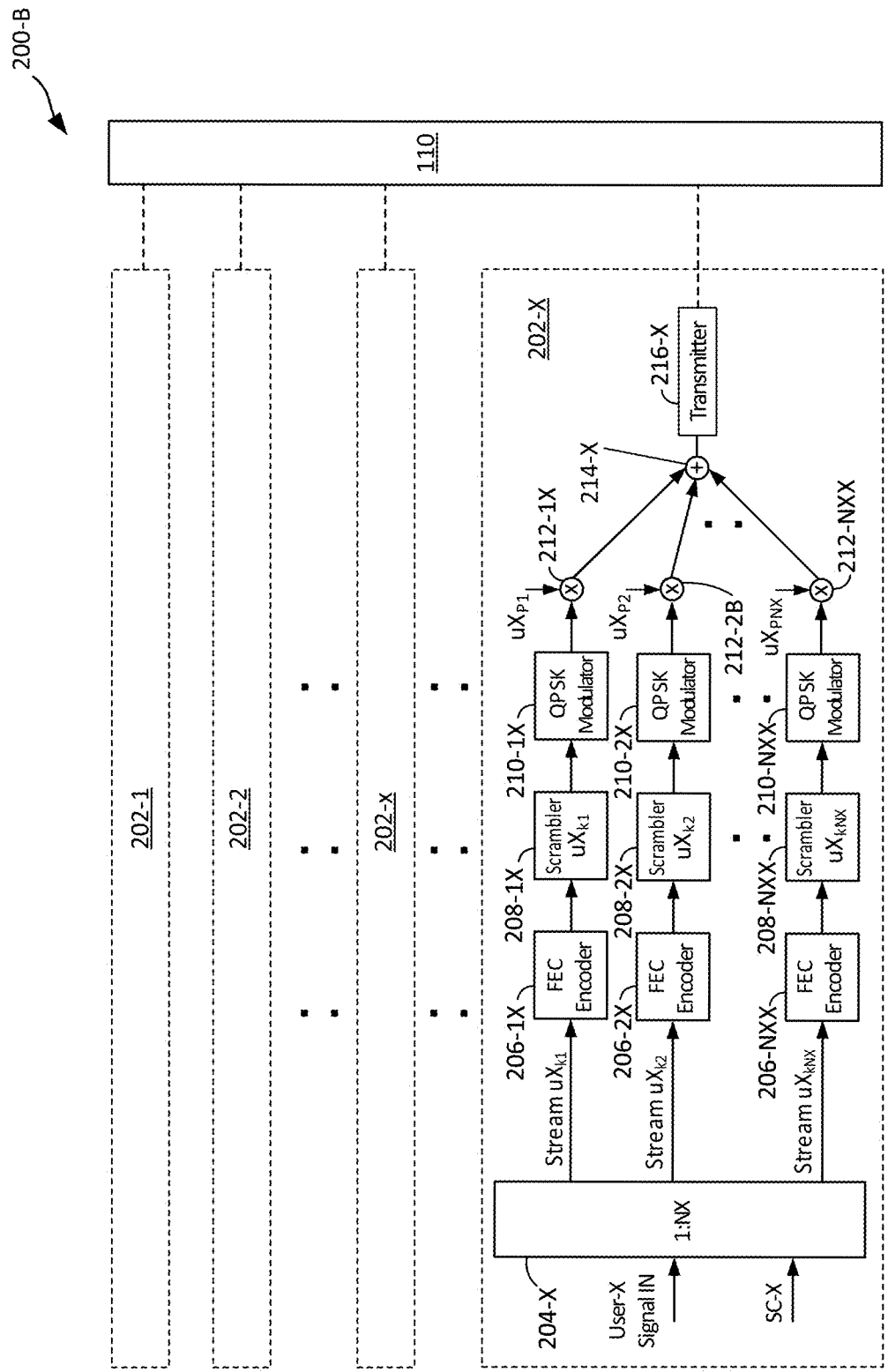
FIG. 4 illustrates another drill-down view of the FIG. 3 implementation including additional exemplary ACMA multiple sub-stream terminals in a system for multiple sub-stream transmit, NOMA communication, according to one or more aspects.

It is understood that the FIG. 2 example showing, in detail, two multiple sub-stream ACMA terminals 202 is not intended as a limitation on the number of multiple sub-stream ACMA transmission units 202. On the contrary, the first and second multiple sub-stream ACMA terminals 202-1 and 202-2 can be representive examples from among a larger plurality of multiple sub-stream ACMA terminals. FIG. 3 illustrates one such implementation, 200-A, of the FIG. 2 system 200. The implementation 200-A includes the first and second multiple sub-stream ACMA terminals 202-1 and 202-2 (shown in high level) being among X multiple sub-stream ACMA terminals 202, labeled 202-$x$, x=1 to X. FIG. 3 shows an arbitrary x$^{th}$ multiple sub-stream ACMA terminal, labeled 202-$x$, in a detailed drill-down view, and shows the Xth multiple sub-stream ACMA terminals 202, labeled 202-X, in high level. FIG. 4 shows, as 200-B, another drill-down view of the FIG. 3 implementation 200-A, illustrating the X$^{th}$ multiple sub-stream ACMA terminal 202-X in higher detail.

Accordingly, even though FIG. 2 shows the transmitter block diagrams for two users, in general an arbitrary number of users can access the channel. The multiple sub-stream ACMA transmission units or terminals 202 can be identically structured. One implementation can also configure each of the multiple sub-stream ACMA transmission units or terminals 202 with a different number of sub-streams. For example, as described above, the integer NA of the 1:NA splitter 204-1 is not necessarily the same as integer NB of the 1:NB splitter 204-2. The implementation of NA and NB can be at time of manufacture, or can be field-configurable. In another implementation, one or more multiple sub-stream ACMA transmission units or terminals 202 can be configured with one or more mechanisms for post-installation changing of the number of sub-streams.

In an implementation, each multiple sub-stream ACMA transmission unit 202 can also include, for each of its N substreams, a forward error encoding (FEC) unit. FIG. 2 illustrates, for the first multiple sub-stream ACMA transmission unit or terminal 202-1, a first terminal first FEC unit 206-1A, a first terminal second FEC unit 206-2A, . . . through a first terminal NA$^{th}$ FEC unit 206-NAA (alternatively referenced herein, collectively, as "FEC units 206-A"). Each of the FEC units 206-A can receive a corresponding one of the sub-streams u1$k$1, u1$k$2, . . . u1$k$NA. FIG. 2 illustrates, for the second multiple sub-stream ACMA transmission unit 202-2, a second terminal first FEC unit 206-1B, a second terminal second FEC unit 206-2B, . . . through a second terminal NB$^{th}$ FEC unit 206-NBB (alternatively referenced herein, collectively, as "FEC units 206-B"). Each of the FEC units 206-B can receive a corresponding one of the sub-streams u2$k$1, u2$k$2, . . . u2$k$NB. In an implementation, each of the FEC units 206-A of the first multiple sub-stream ACMA transmission unit 202-1, each of the FEC units 206-B of the second multiple sub-stream ACMA transmission unit 202-2, and each of the FEC units 206-$x$ of any of one or more additional multiple sub-stream ACMA transmission units or terminals 202 (e.g., the FIG. 3 $x^{th}$ multiple sub-stream ACMA transmission terminal 202-$x$) can be configured to apply conventional ACMA FEC codes, in accordance with conventional published techniques, such as used in the FIG. 1 terminals 102 and, therefore, further detailed description is omitted. As described, the multiple sub-stream ACMA transmission units 202 can each include a respective N FEC units 206, and the value "N" can differ among the units 202. In the FIG. 2 example, N is NA for the first multiple sub-stream ACMA transmission unit 202-1, and is NB for the second multiple sub-stream ACMA transmission unit 202-2. If one or more additional multiple sub-stream ACMA transmission units 202 is included, each will have a corresponding N FEC units 206, each "N" being any integer greater than zero.

It will be understood that "N FEC units 206" means N instances of a FEC logic function, and these N instances can be implemented by respective processing resources of a shared processor device, or by N separate processor devices, or by N dedicated FEC devices, or by any combination thereof. It will also be understood that "unit" and "units," in the context of description herein of the system 200, its functional blocks, and aspects and operations thereof, is logical reference, not necessarily corresponding to a single hardware unit, or to any other particular hardware configuration or architecture.

In another implementation, the FEC units 206 of the multiple sub-stream ACMA transmission units or terminals 202 can be particularly constructed and configured low rate LDPC encoders. For example, the FEC encoders 206 can be rate 1/8 LDPC encoders. Preferably, all of the FEC units 206 of any one of the multiple sub-stream ACMA transmission units 202 are structured the same. Also, the rate 1/8 is only an example, and is not intended as a limitation. For example, other contemplated rates for low rate LDPC encoder implementations of the FEC coders 206 include, but are not limited to, 1/16.

In an implementation, each multiple sub-stream ACMA transmission unit 202 can include N scramblers, each of the scramblers being configured to receive and apply a scrambling process to a corresponding one of the N FEC encoded sub-streams, and to output a corresponding scrambled FEC encoded sub-stream, each scrambling process being mutually different from the N−1 other scrambling processes in that multiple sub-stream ACMA transmission unit 202.

Examples illustrated in FIG. 2 can include, for the first multiple sub-stream ACMA transmission unit or terminal 202-1, a first terminal first scrambler 208-1A, a first terminal second scrambler 208-2A, . . . through a first terminal NA$^{th}$ scrambler 208-NAA (alternatively referenced herein, collectively, as "first terminal scramblers 208-A"). The second multiple sub-stream ACMA transmission unit or terminal 202-2 can similarly include a second terminal first scrambler 208-1B, a second terminal second scrambler 208-2B, . . . through a second terminal NB$^{th}$ scrambler" 208-NBB (alternatively referenced herein, collectively, as "second terminal scramblers 208-B"). Referring to FIG. 3, for any one or more additional multiple sub-stream ACMA transmission units or terminals 202, each $x^{th}$ of such units or terminals 202 can include an $x^{th}$ terminal first scrambler 208-1$x$, an $x^{th}$ terminal second scrambler 208-2$x$, . . . through an $x^{th}$ terminal Nx$^{th}$ scrambler 208-Nxx (alternatively referenced herein, collectively, as "$x^{th}$ terminal scramblers 208-$x$"). The first terminal scramblers 208-1, second terminal scramblers 208-2, and $x^{th}$ scramblers terminal (alternatively referenced herein, collectively, as "scramblers 208") can be configured to apply a modulo-2 addition of $c_k=(c_{k0}, c_{k1}, \ldots, c_{kC-1})$ and $s_k=(s_{k0}, s_{k1}, \ldots, s_{kC-1})$, generating the scrambled sequence $d_k=(d_{k0}, d_{k1}, \ldots, d_{kC-1})$, according to Equation (1) where C is the total number of FEC encoded bits:

$$d_{ki}=c_{ki}+s_{ki} \hspace{2cm} \text{Equation (1)},$$

It will be understood that "N scramblers," as used herein, can mean N differently configured instances of a scrambling function. The N instances of the scrambling functions can be implemented, for example, by respective processing resources of a shared processor device. As one example alternative, the N instances of the scrambling functions can be implemented by N separate processor devices configured to function as scramblers or, for example, by N dedicated scrambler devices, or by any combination thereof. As one specific example, the NA first terminal scramblers 208-A can be implemented by NA separate processor devices configured to function as scramblers or, for example, by NA dedicated scrambler devices, or by any combination thereof.

Referring again to FIG. 2, in an implementation, each multiple sub-stream ACMA transmission unit 202 can include N modulator devices, each being configured to receive a corresponding one of the scrambled FEC encoded sub-stream outputs of a corresponding one of the N scramblers 208, and to modulate a carrier signal with that scrambled FEC encoded sub-stream, and generate a corresponding modulated carrier signal.

Examples of such modulator devices illustrated in FIG. 2 include, for the first multiple sub-stream ACMA transmission unit or terminal 202-1, a first terminal first modulator unit 210-1A, a first terminal second modulator unit 210-2A, . . . through to a first terminal NA$^{th}$ modulator unit 210-NAA (alternatively referenced herein, collectively, as "first terminal modulator units 210-A"). The second multiple sub-stream ACMA transmission unit or terminal 202-2 can include, similarly, a second terminal first modulator unit 210-1B, a second terminal second modulator unit 210-2B, . . . through to a second terminal NB$^{th}$ modulator unit 210-NBB (alternatively referenced herein, collectively, as "second terminal modulator units 210-B"), and so on for other multiple sub-stream ACMA transmission units.

Referring to FIG. 3, an implementation can include two or more multiple sub-stream ACMA terminals 202, generically referenced as multiple sub-stream ACMA terminals 202-$x$, x=1 to X. FIG. 3 illustrates a representative example 202-$x$ in greater detail. As illustrated, each multiple sub-stream ACMA terminal 202-$x$ can include a 1:Nx splitter 204-$x$, outputting Nx sub-streams, labeled uxk1, uxk2, . . . uxkNx, and can include Nx FEC coders, such as the FIG. 3 examples 206-1$x$, 206-2$x$, . . . 206-Nxx, each receiving a corresponding one of the Nx sub-streams, uxk1, uxk2, . . . uxkNx. Each multiple sub-stream ACMA terminal 202-$x$ can also include Nx scrambler units, such as the FIG. 3 examples 208-1$x$, 208-2$x$, . . . 208-Nxx, each receiving an output of a corresponding one of the Nx FEC encoders 206-1$x$, 206-2$x$, . . . 206-Nxx. Each multiple sub-stream ACMA terminal 202-$x$ can include Nx modulator units, such as the FIG. 3 examples 210-1$x$, 210-2$x$, . . . 210-Nxx, each receiving an output of a corresponding one of the Nx scramblers 208-1$x$, 208-2$x$, . . . 208-Nxx. The FIG. 3 modulator unit 210-1$x$ can be referred to as an "$x^{th}$ terminal first modulator unit 210-1$x$," and can be configured, for example, such as the FIG. 2 first terminal first modulator unit 210-1A or second terminal first modulator unit 210-1B. The FIG. 3 modulator unit 210-2$x$ can be referred to as an "$x^{th}$ terminal second modulator unit 210-2$x$," and can be configured, for example, such as the FIG. 2 first terminal second modulator unit 210-2A, or second terminal second modulator unit 210-2B. The modulator unit 210-Nxx can be referred to as an "Nx$^{th}$ modulator unit 210-Nxx," and can be configured such as the FIG. 2 first terminal NA$^{th}$ modulator unit 210-NAA, or the second terminal NB$^{th}$ modulator unit 210-NBB.

Referring to FIG. 2, in an aspect, an individually adjustable power amplifier can be included for each sub-stream, for example, at or incorporated in the outputs of each modulator unit 210-A in the first multiple sub-stream ACMA transmission unit 202-1, or each modulator 210-B in the second multiple sub-stream ACMA transmission unit 202-2, or both. Similarly, adjustable power amplifiers can be included for subsequent multiple sub-stream ACMA transmission units 202-$x$. Examples visible in FIG. 2 include, for the first multiple sub-stream ACMA transmission unit 202-1, adjustable power amplifiers 212-1A, 212-2A, . . . 212-NAA (alternatively referenced herein, collectively, as "first terminal adjustable power amplifiers 212-A" or "adjustable power amplifiers 212-A"). Examples visible for the second multiple sub-stream ACMA transmission unit 202-2 include adjustable power amplifiers 212-1B, 212-2B, . . . 212-NBB (alternatively referenced herein, collectively, as "second terminal adjustable power amplifiers 212-B" or "power amplifiers 212-B"). The first terminal adjustable power amplifiers 212-A and second terminal adjustable power amplifiers 212-B can provide optional per stream power adjustment levels $u1_{Pj}$ as shown in FIG. 2. More specifically, adjustable power amplifiers 212-A of the first multiple sub-stream ACMA transmission unit 202-1 can provide optional per stream power adjustment levels $u1_{P1}$, $u1_{P2}$, . . . $u1_{PNA}$, and adjustable power amplifiers 212-B of the second multiple sub-stream ACMA transmission unit 202-2 can provide optional per stream power adjustment levels $u2_{P1}$, $u2_{P2}$, . . . $u2_{PNB}$, and so on for subsequent multiple sub-stream ACMA transmission units. Referring to FIG. 3, in the general implementation of the xth multiple sub-stream ACMA transmission unit 202-$x$, adjustable power amplifiers 212-1$x$, 212-2$x$, . . . 212-Nxx can provide optional per stream power adjustment levels $ux_{P1}$, $ux_{P2}$, . . . $ux_{PNx}$. This, in turn, can provide optimization of the relative power levels of the multiple sub-streams from any given user's multiple sub-stream ACMA transmission unit, to increase total spectral efficiency of transmissions applying the disclosed multiple sub-stream NOMA scheme.

Referring to FIG. 4, in the general implementation of the Xth multiple sub-stream ACMA transmission unit 202-X, adjustable power amplifiers 212-1X, 212-2X, . . . 212-NXX can provide optional per stream power adjustment levels $uX_{P1}$, $uX_{P2}$, . . . $uX_{PNX}$.

In the first multiple sub-stream ACMA transmission unit 202-1, the NA outputs from the first terminal adjustable power amplifiers 212-1A, 212-2A, . . . 212-NAA (or from non-adjustable power amplifiers, if used) can be combined at 214-1, then input to a transmitter 216-1, which transmits the combined NA outputs from the first terminal adjustable power amplifiers 212-A to propagate through a channel, such as channel CH in FIG. 1 (not visible in FIG. 2), to an ACMA receiver/decoder, for example, the system 100 receiver portion 110. Similarly, in the second multiple sub-stream ACMA terminal 202-2, the NB outputs from the second terminal adjustable power amplifiers 212-1B, 212-2B, . . . 212-NBB (or from non-adjustable power amplifiers, if used) can be combined at 214-2, then input to a transmitter 216-2, which transmits the combined NB outputs from the second terminal adjustable power amplifiers 212-B to propagate through to an ACMA receiver, which can be, but is not necessarily the system 100 receiver portion 110. It will be understood that, since the first multiple sub-stream ACMA terminal 202-1 and the second multiple sub-stream ACMA terminal 202-2 can be differently located with respect to the receiver, e.g., the receiver portion 110, the propagation path for the signal output from the transmitter 216-1 can differ from the propagation path for the signal output from the transmitter 216-2, or from the propagation path for the signal output from other transmitters in the system. More generally, any among X multiple sub-stream ACMA terminals 202 can be differently located with respect to the receiver, e.g., the receiver portion 110, than are any or all of the X−1 other multiple sub-stream ACMA terminals 202 and, therefore, their respective transmission propagation paths can differ.

It should be noted that the FIG. 2 system 200 does not need an additional scrambler for the combination of NA sub-streams output by the first multiple sub-stream ACMA transmission unit or terminal 202-1, or for the combination of NB sub-streams output by the second multiple sub-stream ACMA terminal 202-2, or for the combination of any number of sub-streams output by subsequent multiple sub-stream ACMA terminals. This can provide further reduction in complexity.

As described above, in the system 200 one or more of the multiple sub-stream ACMA transmission units or terminals 202 can be configured with one or more mechanisms for post-installation changing of the number of sub-streams. In one implementation for post-installation changing of the number of sub-streams the system 200, one or more of the 1:N splitters can be implemented as an adjustable 1:N splitter, where "N" can be changed, for example, by a control signal. Referring to FIG. 2, in one example of such implementation for post-installation changing of the number of sub-streams the system 200, the first terminal 1:NA splitter 204-1 can be implemented a first terminal adjustable 1:NA splitter. The first terminal adjustable 1:NA splitter 204-1 can be configured to receive a first splitter control signal, labeled SC-1, and to adjust the quantity NA in response. Similarly, the system 200 can include an implementation of the second terminal 1:NB splitter 204-2 as a second terminal adjustable 1:NB splitter 204-2. The second terminal adjustable 1:NB splitter 204-2 can be configured to a receive a second splitter control signal, labeled SC-2, and to adjust the quantity NB in response. This configuration can be applied to subsequent splitters of other multiple sub-stream ACMA terminals 202. For example, referring to FIG. 3, the system 200-A can include an implementation of the $x^{th}$ terminal 1:Nx splitter 204-$x$ as an adjustable 1:Nx splitter, configured to a receive an $x^{th}$ splitter control signal, labeled SC-x, and to adjust the quantity Nx in response. As another example, referring to FIG. 4, the system 200-B can include an implementation of the $X^{th}$ terminal 1:NX splitter 204-X as an adjustable 1:NX splitter, configured to a receive an $X^{th}$ splitter control signal, labeled SC-X, and to adjust the quantity NX in response.

Referring again to FIG. 2, as illustrated, the first terminal first FEC unit 206-1A feeds the first terminal first scrambler 208-1A. In an aspect, the first terminal first FEC unit 206-1A and the first terminal first scrambler 208-1A can be configured to form what can be referred to as a first terminal first FEC-scrambler (shown in FIG. 2 but not separately numbered). In a similar aspect, the first terminal second FEC unit 206-2A and the first terminal second scrambler 208-2A can be configured to form what can be referred to as a first terminal second FEC-scrambler (visible in FIG. 2 but not separately numbered). This can continue through to the first terminal $NA^{th}$ FEC unit 206-NAA and the first terminal $NA^{th}$ scrambler 208-NAA, which can be configured to form what can be referred to as a first terminal $NA^{th}$ FEC-scrambler (visible in FIG. 2 but not separately numbered). For purposes of description, the first terminal first FEC-scrambler, the first terminal second FEC-scrambler, through to the first terminal $NA^{th}$ FEC-scrambler, can be collectively referred to as "first terminal FEC-scramblers."

In an aspect, for each xth of the NA first terminal FEC-scramblers, its component first terminal FEC unit 206-xA can be further configured, or its component first terminal scrambler unit 208-xA can be further configured, or both of these components can be configured, such that a plurality of the NA first terminal FEC-scrambler units' scrambled FEC encoded sub-streams have a relative timing such that the plurality of NA scrambled FEC encoded sub-streams are not aligned, i.e., are asynchronous with respect to one another. In an aspect, the configuration can be such that all of the NA scrambled FEC encoded sub-streams are asynchronous with respect to one another. This configuration, where a plurality of, or all NA of the NA scrambled FEC encoded sub-streams are asynchronous with respect to one another, can provide features and benefits that can include, but are not limited to, improvement in error rate performance.

The above-described timing feature can be implemented for the second terminal 202-2, for example, by configuring the second terminal first FEC unit 206-1B and its corresponding second terminal first scrambler 208-1B to form what can be referred to as a second terminal first FEC-scrambler (visible in FIG. 2 but not separately numbered). This implementation can continue, for example, to configuring the second terminal $NB^{th}$ FEC unit 206-NBB and its corresponding terminal $NB^{th}$ scrambler 208-NBB to form what can be referred to as a second terminal $NB^{th}$ FEC-scrambler (visible in FIG. 2 but not separately numbered). In an aspect, for each xth of the NB second terminal FEC-scramblers, its component second terminal FEC unit 206-xB can be further configured, or its component second terminal scrambler unit 208-xB can be further configured, or both of these components can be configured, such that a plurality of the NB FEC-scrambler units' scrambled FEC encoded sub-streams have a relative timing such that the plurality of NB scrambled FEC encoded sub-streams are not aligned, i.e., are asynchronous with respect to one another. The above-described timing feature can be implemented for subsequent multiple sub-stream ACMA terminals 202 as well (not visible in FIG. 2.)

Figure 5A:
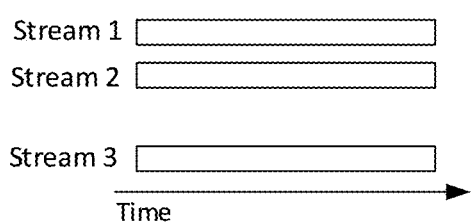
FIG. 5A shows an example of sub-streams in alignment.
Figure 5B:
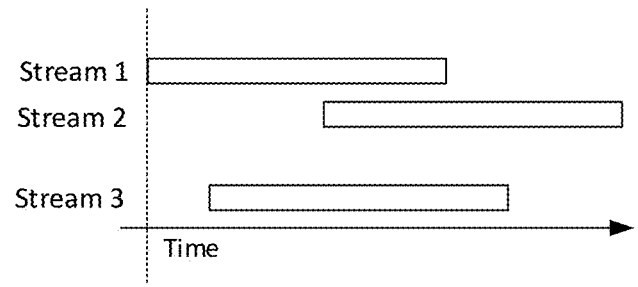
FIG. 5B shows an example of non-aligned, asynchronous sub-streams, illustrating one exemplary type of multiple sub-stream offset, in systems and methods for synchronous and asynchronous multiple sub-stream NOMA communication, according to one or more aspects.

FIG. 5A shows an example of sub-streams in alignment. FIG. 5B shows an example of non-aligned, asynchronous sub-streams. In an aspect, the error rate performance can improve if the multiple streams of a particular user are not aligned in a synchronous manner, as in FIG. 5A and, instead, they are added asynchronously, as in FIG. 5B. In other words, the starting and ending points of multiple streams are not aligned as depicted in FIG. 5B.

Figure 6:
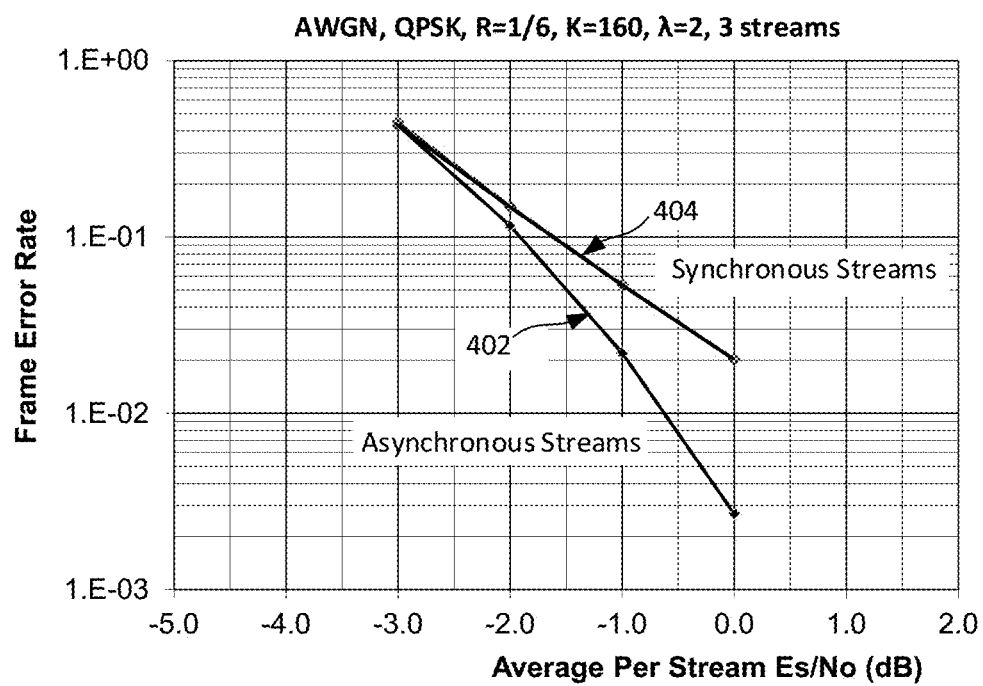
FIG. 6 illustrates a simulation result, showing improved bit error performance for asynchronous user sub-streams compared to synchronous user sub-streams.

FIG. 6 illustrates a simulation showing that the asynchronous multi sub-stream design achieves a better performance, by plot line 602, than synchronous multi sub-stream design as shown by plot line 604 in FIG. 6. Here each sub-stream is encoded using a rate 1/8 LDPC code with information block size of K=160 bits. For this example, each user is allocated three sub-streams and the three sub-streams are either transmitted synchronously or asynchronously. The user arrival rate is asynchronous in both cases. As shown in the simulation results, there is more than 1 dB gain at FER=$10^{-2}$, when aynchronous multi sub-stream transmission is used.

Figure 7:
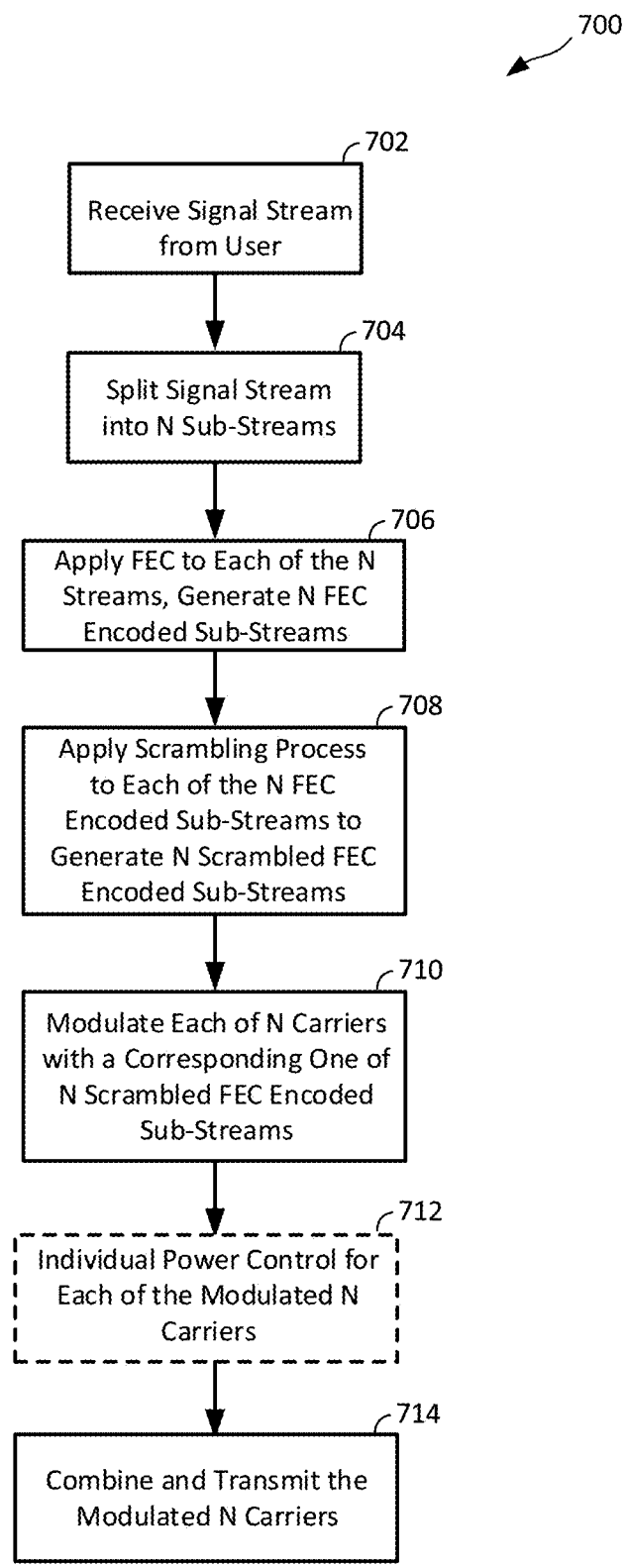
FIG. 7 is a logical flow diagram of operations within one or more methods for asynchronous multiple sub-stream NOMA communication, according to one or more aspects.

FIG. 7 shows a process flow 700 in a method for increasing spectral efficiency in NOMA communication. The flow 700 can start at 702, where a signal stream is received from a user, then proceed to 704, which splits the signal stream into N sub-streams. Referring to FIGS. 2, 3, 4, and 7, in a flow 700 performed by the first multiple sub-stream ACMA transmission unit 202-1, the value of N is NA, and for flow 700 performed by the second multiple sub-stream ACMA transmission unit 202-2, the value of N is NB. Referring to FIG. 7, the flow 700 proceeds from 704 to 706 and applies a forward error coding (FEC) to each of the N sub-streams, and outputs a corresponding N FEC encoded sub-streams. The flow 700 proceeds from 706 to 708 and applies a scrambler process to each of the N FEC encoded sub-streams, to output a corresponding N scrambled FEC coded sub-streams, each of N scrambling processes being mutually different from the N−1 other scrambling processes. The flow 700 then proceeds to 710 and modulates a corresponding carrier with one of the N scrambled FEC encoded sub-streams and, optionally, at 712 applies individual power control to the N modulated carriers. The flow 700 then, either from 712 or directly from 710, proceeds to 714 to combine and transmit the N modulated carrier signals.

Benefits and features can include an arbitrary number of users using the channel CH simultaneously. Benefits and features can also include users transmitting asynchronously without any coordination among themselves, in other words, partial overlaps between users are permitted.

Figure 8:
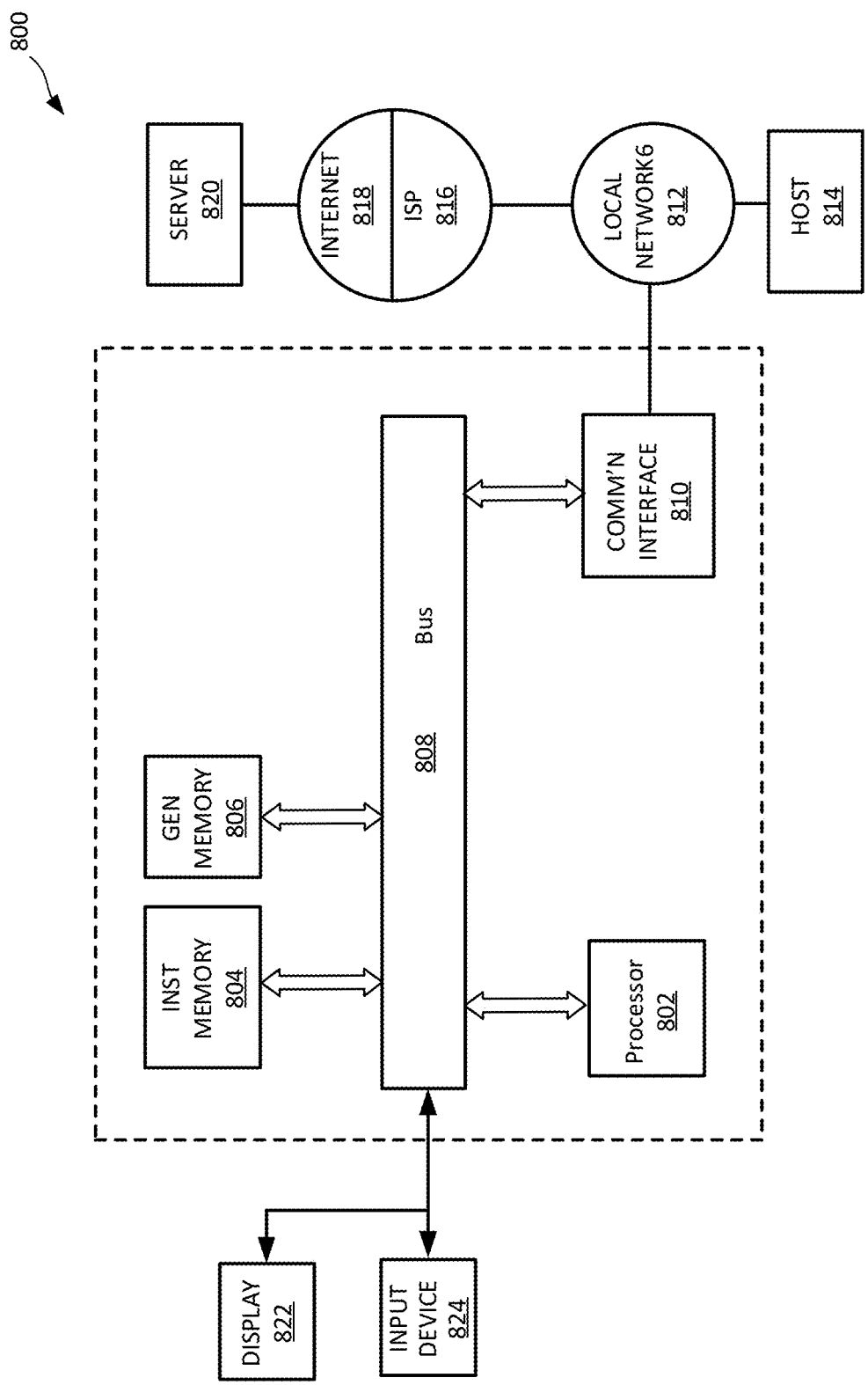
FIG. 8 is a functional block diagram of an example computer system upon which aspects of this disclosure may be implemented.

FIG. 8 is a block diagram illustrating a computer system 800 upon which aspects of this disclosure may be implemented, such as, but not limited to, particular logic blocks described in reference to FIG. 7. It will be understood that logic blocks illustrated in FIG. 8 represent functions, and do not necessarily correspond to particular hardware on a one-to-one basis. The computer system 800 can include a data processor 802, instruction memory 804, and a general purpose memory 806, coupled by a bus 808.

The instruction memory 806 can include a tangible medium retrievably storing computer-readable instructions, that when executed by the data processor 802 cause the processor to perform operations, such as described in reference to FIGS. 2, 3, 4, and 7.

The computer system 800 can also include a communications interface 810, configured to interface with a local network 812 for accessing a local server 814, and to communicate through an Internet service provider (ISP) 816 to the Internet 818, and access a remote server 820. The computer system 800 can also include a display 822 and a user interface 824, such as a touchscreen or keypad.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracing of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that terms and expressions used herein have the ordinary meaning accorded to such terms and expressions in their respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

In the foregoing Detailed Description, it can be seen that various features are grouped together in various examples for the purpose of streamlining the disclosure. This method of disclosure is not to be interpreted as reflecting an intention that any summary recitation requires more features than it expressly recites. The following claims form a portion of this disclosure.

What is claimed is:

1. A system for increasing spectral efficiency comprising:
    a 1:N signal stream splitter, configured to receive a signal stream, and split the signal stream into N sub-streams, N being an integer greater than one;
    N of forward error encoding (FEC)-scramblers configured to receive the N sub-streams and output a corresponding N scrambled FEC encoded sub-streams, wherein each of the N FEC-scramblers includes a corresponding FEC unit and a corresponding one of N scramblers, and wherein, in each of the N FEC-scramblers,
        an FEC encoder is configured to receive a corresponding one of the N sub-streams, apply an FEC process to the sub-stream, and generate a corresponding FEC encoded sub-stream, to form N FEC encoded sub-streams, and
        a scrambler is configured to receive the generated FEC encoded sub-stream and output a corresponding scrambled FEC encoded sub-stream, to form N scrambled FEC encoded sub-streams;
    N modulator devices, each configured to receive a corresponding one of the N scrambled FEC encoded sub-streams and to modulate a carrier signal with the scrambled FEC encoded sub-stream, and generate a corresponding modulated carrier signal, to form N modulated carrier signals, each carrying a corresponding one of the scrambled FEC encoded sub-streams; and
    a combiner/transmitter device, configured to combine and transmit the N modulated carrier signals.

2. The system of claim 1, further comprising N controllable gain power amplifiers, wherein each of the N controllable gain power amplifiers is configured to:
    receive a corresponding one of the N modulated carrier signals,
    receive an individual power control signal, and
    output the corresponding modulated carrier signal to the combiner/transmitter device at a gain corresponding to the individual power control signal, wherein
    the respective power gains of the N power amplifiers are configured to cause the combiner/transmitter to transmit the corresponding N modulated carrier signals as N unequal power level modulated carrier signals.

3. The system of claim 1, wherein:
    the FEC unit of at least one of the N FEC-scramblers consists of a low rate R FEC coder device.

4. The system of claim 3, wherein R is at least one of 1/8 and 1/16.

5. The system of claim 1, wherein:
    the 1:N signal stream splitter, the N FEC-scramblers, the N modulator devices, and the N:1 combiner/transmitter are within an $xt^h$ terminal among a plurality of terminals, N being Nx for each of the X terminals, each of the X terminals includes a corresponding 1:Nx signal stream splitter, Nx FEC-scramblers, Nx modulator devices, and an Nx:1 combiner/transmitter, Nx being an integer greater than one;
    the 1:Nx signal stream splitter of each $x^{th}$ terminal is configured to receive a corresponding $x^{th}$ terminal signal stream, and split the $x^{th}$ terminal signal stream into a corresponding $xt^h$ terminal sub-stream, forming Nx $xt^h$ terminal sub-streams;

in each of the Nx FEC-scramblers of each $xt^h$ terminal,
the FEC encoder is configured to receive a corresponding one of the $x^{th}$ terminal's Nx sub-streams, apply an FEC process and generate a corresponding $x^{th}$ terminal FEC encoded sub-stream, forming Nx $x^{th}$ terminal FEC encoded sub-streams, and the scrambler is configured to receive the corresponding $x^{th}$ terminal encoded FEC sub-stream and output a corresponding $x^{th}$ terminal scrambled FEC encoded sub-stream, forming Nx $x^{th}$ terminal scrambled FEC encoded sub-streams;

each of the Nx modulator devices of each $x^{th}$ terminal is configured to receive a corresponding one of the $x^{th}$ terminal's Nx scrambled FEC encoded sub-streams, and to modulate an $x^{th}$ terminal carrier signal with the $x^{th}$ terminal scrambled FEC encoded sub-stream, and output a corresponding $x^{th}$ terminal modulated carrier signal, forming Nx $x^{th}$ terminal modulated carrier signals, each carrying a corresponding one of the $x^{th}$ terminal Nx scrambled FEC encoded sub-streams; and the Nx:1 combiner/transmitter device of each $x^{th}$ terminal is configured to combine and transmit the $x^{th}$ terminal's Nx modulated carrier signals, wherein for each of the $x^{th}$ terminal's Nx FEC-scramblers, the corresponding FEC unit is further configured, or the corresponding scrambler is further configured, or both the corresponding FEC unit and the corresponding scrambler are further configured to output the Nx scrambled FEC encoded sub-streams as an Nx sub-stream ASCMA transmission configured for iterative soft-in-soft-out decoding.

6. The system of claim 5, wherein:
the X terminals includes a first terminal and a second terminal;
the 1:Nx signal stream splitter of the first terminal is a first terminal 1:NA signal stream splitter, configured to receive a corresponding first terminal signal stream, and split the first terminal signal stream into a corresponding NA first terminal sub-streams NA being an integer greater than one;
the Nx FEC-scramblers of the first terminal include NA first terminal FEC-scramblers and wherein, for each first terminal FEC-scrambler,
the FEC unit is configured to receive a corresponding one of the first terminal's NA sub-streams, apply a first terminal FEC process and generate a corresponding first terminal FEC encoded sub-stream, forming NA first terminal FEC encoded sub-streams, and
the scrambler is configured to receive the generated FEC encoded sub-stream and output a corresponding scrambled FEC encoded sub-stream, to form NA scrambled FEC encoded sub-streams,
the Nx modulator devices of the first terminal include NA first terminal modulator devices, each of the NA first terminal modulator device is configured to receive a corresponding one of the first terminal's NA scrambled FEC encoded sub-streams, and to modulate a first terminal carrier signal with the first terminal scrambled FEC encoded sub-stream, and output a corresponding first terminal modulated carrier signal that carries the first terminal scrambled FEC encoded sub-stream, forming NA first terminal modulated carrier signals; and the Nx:1 combiner/transmitter device of the first terminal is a first terminal NA:1 combiner/transmitter device, configured to combine and transmit the NA first terminal modulated carrier signals.

7. The system of claim 6, wherein:
the 1:Nx signal stream splitter of the second terminal is a second terminal 1:NB signal stream splitter, configured to receive a corresponding second terminal signal stream, and split the second terminal signal stream into a corresponding NB second terminal sub-streams, NB being an integer greater than one;
the Nx FEC units of the second terminal include NB second terminal FEC units, each second terminal FEC unit configured to receive a corresponding one of the second terminal's NB sub-streams, apply a second terminal FEC process and output a corresponding second terminal FEC encoded sub-stream, forming NB second terminal FEC encoded sub-streams;
the Nx scrambler units of the second terminal include NB second terminal scramblers, each second terminal scrambler configured to receive a corresponding one of the second terminal's NB FEC encoded sub-streams, apply a second terminal scrambling process and output a corresponding second terminal scrambled FEC encoded sub-stream, forming NB second terminal scrambled FEC encoded sub-streams;
the Nx modulator devices of the second terminal include NB second terminal modulator devices, each NB second terminal modulator device is configured to receive a corresponding one of the NB second terminal scrambled FEC encoded sub-streams, and to modulate a second terminal carrier signal with the second terminal scrambled FEC encoded sub-stream and output a corresponding second terminal modulated carrier signal, forming NB second terminal modulated carrier signals, each carrying a corresponding one of the NB second terminal scrambled FEC encoded sub-streams; and
the Nx:1 combiner/transmitter device of the second terminal is a second terminal NB:1 combiner/transmitter device, configured to combine and transmit the NB second terminal modulated carrier signals.

8. The system of claim 1, wherein the 1:N signal stream splitter is configured to receive a splitter control signal that indicates N, and to adjust the quantity N of sub-streams in accordance with N.

9. The system of claim 1, wherein:
the plurality of FEC units includes N FEC units,
each of the N FEC units feeds a corresponding one of the N scramblers, to form a respective FEC-scrambler, forming N FEC-scramblers,
each of the N FEC-scramblers is configured to output a corresponding one of the N scrambled FEC encoded sub-streams, and
for each of the N FEC-scramblers, the corresponding FEC unit is further configured, or the corresponding scrambler is further configured, or both the corresponding FEC unit and the corresponding scrambler are further configured to output the N FEC-scrambler unit's scrambled FEC encoded sub-stream timing at a relative timing wherein a plurality of the N scrambled FEC encoded sub-streams are asynchronous with respect to one another.

10. The system of claim 9, wherein:
for each of the N FEC-scramblers, the corresponding FEC unit is further configured, or the corresponding scrambler is further configured, or both the corresponding FEC unit and the corresponding scrambler are further configured to output the N FEC-scrambler unit's scrambled FEC encoded sub-stream timing at a relative timing wherein all N scrambled FEC encoded sub-streams are asynchronous with respect to one another.

11. The system of claim 1, wherein, for each of the N FEC-scramblers, the respective FEC unit is further configured, or the respective scrambler is further configured, or both the FEC unit and the scrambler are further configured to output the N scrambled FEC encoded sub-streams with a configuration for ACMA transmission and iterative soft-in-soft-out decoding.

12. A method for increasing spectral efficiency in transmitting a user signal stream from a terminal, the method comprising:
receiving in the terminal a user signal stream from a user;
splitting the signal stream into N sub-streams;
applying a forward error coding (FEC) to each of the N sub-streams, and outputting a corresponding FEC encoded sub-stream, forming N FEC encoded sub-streams;
applying N scrambling processes, each to a corresponding one of the N FEC encoded sub-streams, and each outputting a corresponding terminal scrambled FEC encoded sub-stream, forming N terminal scrambled FEC encoded sub-streams;
modulating a carrier signal with each of the N terminal scrambled FEC encoded sub-streams, and outputting a corresponding N modulated carrier signals, each carrying a corresponding one of the N terminal scrambled FEC encoded sub-streams; and
combining and transmitting the corresponding N modulated carrier signals, each of the N transmitted modulated carrier signals carrying a respective one of the N terminal scrambled FEC encoded sub-streams.

13. The method of claim 12, further including:
individually controlling an output power at which each of the N modulated carrier signals is transmitted, wherein the controlling is configured to provide the N modulated carrier signals as N adjustably unequal power modulated carrier signals.

14. The method of claim 12, wherein:
the modulated carrier signals are at relative timings wherein the N sub-streams carried by the modulated carrier signals are asynchronous with respect to one another.

15. The method of claim 12, further comprising:
receiving the N modulated carrier signals;
applying an iterative soft-in-soft-out recovery process to the N modulated carrier signals and generating a corresponding N recovered bit streams; and
combining the N recovered bit streams into a recovered user signal stream.

16. The method of claim 12, wherein: applying the FEC to each of the N sub-streams includes applying a low rate R FEC coding.

17. The method of claim 16, wherein R is at least one of 1/8 and 1/16.

18. The method of claim 12, wherein applying the FECs to each of the N sub-streams is configured, or applying the terminal scrambling to each of the N FEC encoded sub-streams is configured, or both the applying the FEC to each of the N sub-streams and applying the terminal scrambling to each of the N FEC encoded sub-streams are configured to output the N terminal scrambled FEC encoded sub-streams in a configuration for ACMA transmission and iterative soft-in-soft-out decoding.

19. The method of claim 12, wherein applying the FEC to each of the N sub-streams is configured, or applying the terminal scrambling to each of the N FEC encoded sub-streams is configured, or both applying the FEC to each of the N sub-streams and applying the terminal scrambling to each of the N FEC encoded sub-streams are configured to cause all N of the terminal scrambled FEC encoded sub-streams to be asynchronous with respect to one another.

20. A computer readable medium on which are stored computer instructions and data that, when executed by a computer, collectively cause the computer to perform, in a terminal, the method of:
receiving in the terminal a user signal stream from a user;
splitting the user signal stream into N sub-streams;
applying a forward error coding (FEC) to each e-Fie of the N sub-streams, and outputting a corresponding FEC encoded sub-stream, forming N FEC encoded sub-streams;
applying N scrambling processes, each to a corresponding one of the N FEC encoded sub-streams to output a corresponding terminal scrambled FEC encoded sub-stream, forming N terminal scrambled FEC encoded sub-streams;
modulating a carrier with each of the N terminal scrambled FEC encoded sub-streams, forming a corresponding N modulated carrier signals, each carrying a corresponding one of the N terminal scrambled FEC encoded sub-streams; and
combining and causing a transmitter to transmit the corresponding N modulated carrier signals, each of the N transmitted modulated carrier signals carrying a respective one of the N terminal scrambled FEC encoded sub-streams.

\* \* \* \* \*

UNITED STATES PATENT AND TRADEMARK OFFICE
CERTIFICATE OF CORRECTION

PATENT NO. : 10,763,993 B2  
APPLICATION NO. : 16/010526  
DATED : September 1, 2020  
INVENTOR(S) : Mustafa Eroz and Lin-Nan Lee Page 1 of 1

It is certified that error appears in the above-identified patent and that said Letters Patent is hereby corrected as shown below:

In the Claims

Column 12, Line 13 "N of forward error encoding (FEC)-scramblers configured" should be -- N forward error encoding (FEC)-scramblers configured --;

Column 12, Line 59 "are within an $xt^h$ terminal among a plurality of termi-" should be -- are within an $x^{th}$ terminal among a plurality of termi- --;

Column 13, Line 1 "into a corresponding $xt^h$ terminal sub-stream, forming" should be -- into a corresponding $x^{th}$ terminal sub-stream, forming --;

Column 13, Line 2 "Nx $xt^h$ terminal sub-streams;" should be -- Nx $x^{th}$ terminal sub-streams; --;

Column 13, Line 3 "in each of the Nx FEC-scramblers of each $xt^h$ terminal," should be -- in each of the Nx FEC-scramblers of each $x^{th}$ terminal, --;

Column 13, Line 58 "first terminal modulator devices, each of the NA first" should be -- first terminal modulator devices, each NA first --;

Column 16, Line 31 "applying a forward error coding (FEC) to each e-Fie of the" should be -- applying a forward error coding (FEC) to each of the --.

Signed and Sealed this  
Eighth Day of December, 2020

Andrei Iancu  
*Director of the United States Patent and Trademark Office*